(12) United States Patent
Bihlet et al.

(10) Patent No.: US 6,554,138 B1
(45) Date of Patent: Apr. 29, 2003

(54) CLEANING DEVICE

(75) Inventors: Klaus Bihlet, Gjerlev (DK); Angus J. Bishop, York N. Yorkshire (GB)

(73) Assignee: DISA A/S, Herlev (DK)

( * ) Notice: Subject to any disclaimer, the term of this patent is extended or adjusted under 35 U.S.C. 154(b) by 0 days.

(21) Appl. No.: 09/914,734

(22) PCT Filed: Mar. 2, 2000

(86) PCT No.: PCT/EP00/01801

§ 371 (c)(1),
(2), (4) Date: Jan. 3, 2002

(87) PCT Pub. No.: WO00/51709

PCT Pub. Date: Sep. 8, 2000

(30) Foreign Application Priority Data

Mar. 2, 1999 (DE) .......................... 199 09 075

(51) Int. Cl.⁷ .................. B01D 46/12; B01D 29/52; B01D 29/68
(52) U.S. Cl. .................. 210/411; 210/333.01; 55/302; 55/379
(58) Field of Search .................. 55/302, 379; 210/411, 210/333.01

(56) References Cited

U.S. PATENT DOCUMENTS

| | | | | |
|---|---|---|---|---|
| 2,079,315 A | * | 5/1937 | Dickerson | |
| 3,606,736 A | * | 9/1971 | Leliaert et al. | |
| 3,726,066 A | * | 4/1973 | Colley et al. | |
| 3,798,878 A | * | 3/1974 | Pausch | |
| 3,844,750 A | * | 10/1974 | Ray | |
| 3,853,509 A | * | 12/1974 | Leliaert | |
| 3,891,418 A | * | 6/1975 | Burger et al. | |
| 3,942,962 A | * | 3/1976 | Duyckinck | |
| 4,073,632 A | * | 2/1978 | Reinauer et al. | |
| 4,105,421 A | * | 8/1978 | Rheinfrank, Jr. et al. | |
| 4,251,244 A | * | 2/1981 | Evenstad | |
| 4,272,263 A | * | 6/1981 | Hancock | |
| 4,278,454 A | * | 7/1981 | Nemesi | |
| 4,280,826 A | | 7/1981 | Johnson, Jr. | |
| 4,289,511 A | | 9/1981 | Johnson, Jr. | |
| 4,645,520 A | * | 2/1987 | Huttlin | |
| 5,062,867 A | * | 11/1991 | Klimczak | |

FOREIGN PATENT DOCUMENTS

EP 0531657 3/1993

* cited by examiner

Primary Examiner—Thomas M. Lithgow
(74) Attorney, Agent, or Firm—Friedrich Kueffner

(57) ABSTRACT

The invention relates to a device for cleaning the filter surface of a filter element, through which the liquid to be filtered flows, during a filtration operation using a pressurised cleaning fluid. According to an improvement of the invention, a distribution device is provided which delivers an essentially even pressure distribution of the cleaning fluid over the entire area of the filter surface to be cleaned.

13 Claims, 1 Drawing Sheet

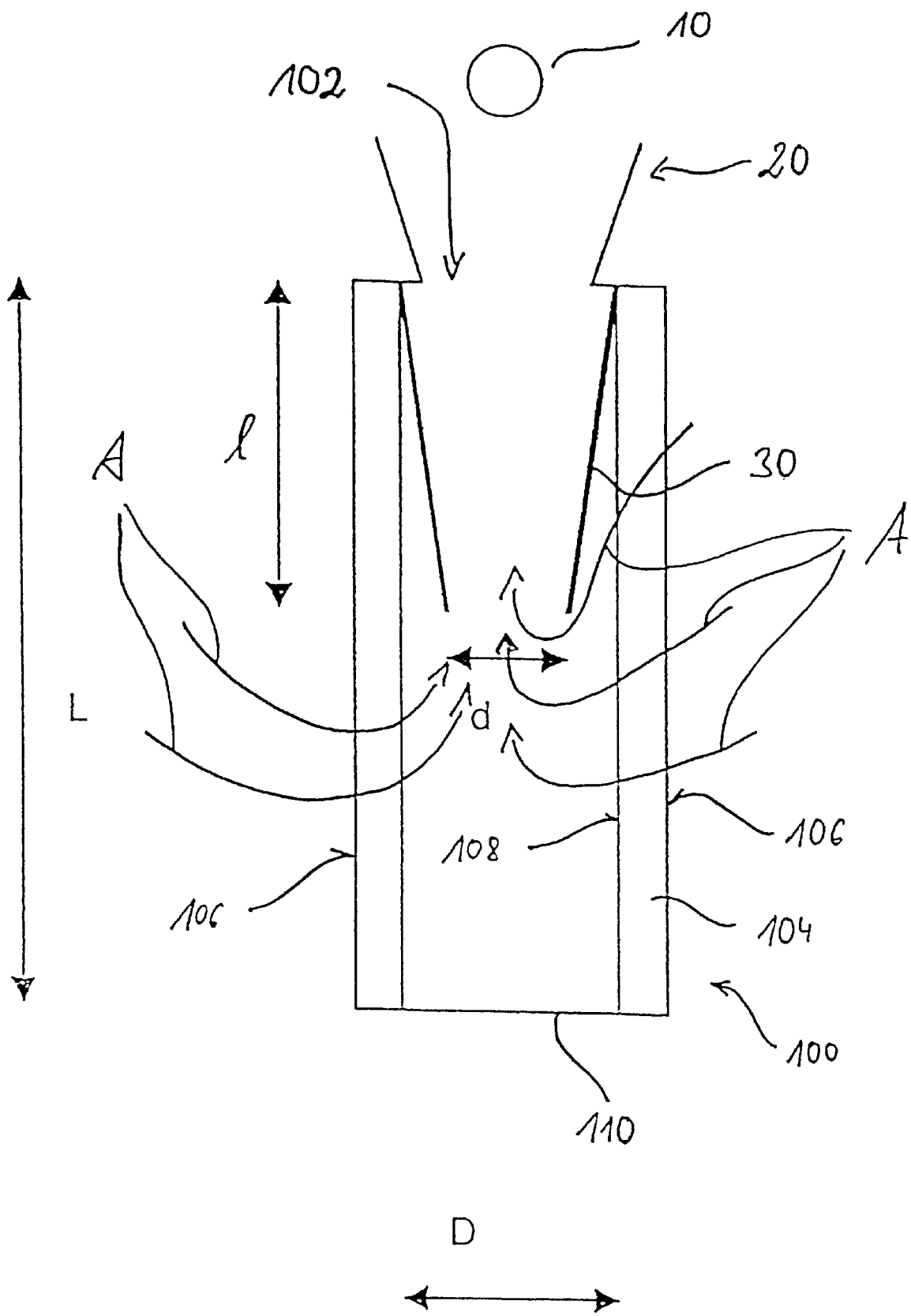

CLEANING DEVICE

BACKGROUND OF THE INVENTION

1. Field of the Invention

The invention relates to a device for cleaning a filter surface of a filter element, through which liquid to be filtered flows during a filtration operation, by means of a pressurized cleaning fluid.

2. Description of the Related Art

Such devices are, for example, required for cleaning dust filters used in industrial facilities. The dust filters used for industrial purposes are in many cases approximately in the form of a hollow cylinder wherein at one end of the filter elements an outlet opening for the cleaned fluid such as, for example, flue gas from which dust has been removed, is provided while a cylinder mantle surface of the filter element is formed by a filter substance such as a filter membrane or a filter fleece. This mantle surface of the filter element then forms the filter surface through which during the filtration operation the fluid to be cleaned, such as flue gas, flows, wherein the dust particles contained in the flue gas are retained by the filter substance in order to thus provide the desired cleaning effect. In this connection, the fluid to be cleaned impacts onto the outer surface of the filter element and is then guided away through the hollow space formed by the filter element or the outlet opening provided at one axial end of the filter element.

During the above-mentioned filtration operation a filtration dust cake is formed on the outer side of the filter element or of the filter surface which increases with increasing operating duration the flow resistance of the filter element for the fluid to be cleaned flowing therethrough. This increase of the flow resistance causes a pressure loss of the fluid flow when passing through the filter element which, in turn, impairs the discharge of the cleaned fluid or makes it possible only by means of an expensive and high-energy additional suction device.

Accordingly, the filter surfaces of the filter element must generally be cleaned regularly in order to ensure a disturbance-free operation in this way.

For this purpose, conventionally a pressurized cleaning fluid, such as compressed air, is introduced through the outlet opening into the interior of the filter in order to remove in this way the filtration dust cake formed on the outer side of the filter element or of the filter surface. However, it was found that filter elements cleaned in this way again generate a high-pressure drop of the fluid flow to be cleaned already after a comparatively short operating period. As a solution to this problem it has been suggested already to introduce the compressed air used as the cleaning fluid in the form of individual compressed air pulses into the interior of the filter element. Moreover, it has been suggested to guide the cleaning fluid by means of nozzles into the interior of the filter element wherein the nozzle openings of the nozzles have a smaller diameter than the outlet opening of the filter element in order to thus entrain, in addition to the compressed air acting as the cleaning fluid, also ambient air into the interior of the filter element and to increase the air volume introduced into the filter element.

Even though with the described measures an improvement of the cleaning action of the cleaning fluid can be obtained, it was found that even the introduction of the cleaning fluid into the interior of the filter element in the form of individual pressure pulses and/or by means of a suitable introduction nozzles, in comparison to a disruption-free service life after the first initial start-up of the filter element, a high-pressure loss of the fluid flow to be cleaned occurred again already after a short operating period.

SUMMARY OF THE INVENTION

In view of these problems of the prior art, it is an object of the invention to provide a device of the aforementioned kind which makes possible a disruption-free operation as long as possible of the filter element cleaned therewith.

According to the invention this object is solved by a further development of the above discussed cleaning devices which is substantially characterized in that a distribution device is provided with which a substantially uniform pressure distribution of the cleaning fluid in the area of the entire filter surface to be cleaned is promoted.

The solution is based on the recognition that even the use of suitable nozzles for introducing the cleaning fluid into the filter element and the introduction of the cleaning fluid in the form of individual pressure pulses result in a dynamic pressure of the cleaning fluid in the area of the axial end of the filter element facing away from the outlet opening which favors the cleaning action of the filter surfaces in the area of the filter element bottom but results in an incomplete cleaning of the filter surface in the area of the outlet opening. Accordingly, when using the known cleaning devices a satisfactory cleaning action takes place only in the area immediately adjacent to the filter element bottom of the filter surface. Because this area provides lowest flow resistance for the fluid to be cleaned, the fluid flow will concentrate in this area after a new start-up of the cleaned filter element which again favors the formation of a filter cake increasing the flow resistance so that very quickly a degree of soiling requiring a new cleaning action of the filter element is reached.

With the further development according to the invention of the known cleaning devices, a uniform pressure distribution of the cleaning fluid in the area of the entire filter surface to be cleaned is achieved which results in a uniform cleaning of the entire filter surface so that, in turn, the concentration of the fluid flow during the filtration operation onto individual filter surface segments is excluded. Accordingly, the use of the cleaning device according to the invention can effectively prevent the fast deposition of a filter cake on individual filter surface segments and thus also an excessively fast increase of the flow resistance of the filter element during filtration operation for a constant fluid flow, and the service life of the filter element can be increased.

The uniform pressure distribution of the cleaning fluid can, for example, be achieved by using a distribution device with a flow guiding surface for the cleaning fluid exiting from a pressure line. In this connection, on the one hand, the use of flow guiding surfaces is possible with which a laminar flow of the cleaning fluid is generated that ensures the desired uniform pressure distribution. It is however especially advantageous when a turbulent flow of the cleaning fluid flowing into the interior of the filter element is generated by the flow guiding surface because such flow guiding surfaces can be embodied in a particularly simple design that is however very effective. For this purpose, the distribution device has expediently a distribution element that can be inserted into an opening of the filter element providing a discharge for the fluid to be cleaned during the filtration operation. Such a distribution element can be inserted for the cleaning process into the filter element and can be removed again from the filter element for performing the actual filtration process. In addition, the use of distribution elements which remain during the filtration operation in the filter element, for example, in the form of a component that is fixedly connected to the filter element, is however also considered. For example, the distribution element can extend, beginning at the opening arranged at one axial end of the filter element, into the interior of the filter element which is at least substantially delimited by the preferably cylinder mantle-shaped cylinder mantle surface. With this arrangement, a particularly space-saving complete configuration is made possible, in particular, in the case of a distribution element remaining in the filter element during the filtration operation.

The turbulent flow of the cleaning fluid introduced through the opening of the filter element, which turbulent flow effects the desired uniform pressure distribution of the cleaning fluid, can be realized, while simultaneously ensuring a minimal flow resistance during the filtration operation, in an especially simple way when the distribution element has a flow guiding surface that is cylinder mantle-shaped or truncated cone-shaped and extends coaxially to the substantially cylinder mantle-shaped filter surface. For this purpose, the distribution element is preferably as a whole in the form of a cylinder mantle or a truncated cone mantle. In this way, the desired uniform pressure distribution of the cleaning fluid during the cleaning process can be ensured while ensuring at the same time an especially minimal increase of the flow resistance during the filtration operation when the distribution element beginning at the opening extends across 20 to 70%, preferably 20 to 50%, of the axial length of the filter element and the diameter of the distribution element at the end facing away from the opening corresponds to approximately 40 to 95% of the inner diameter of the filter element. At its end facing the opening of the filter element, the distribution element can have a diameter which corresponds to the inner diameter of the filter element or the opening or can have a diameter which is slightly smaller. In the case that for introduction of the cleaning fluid a nozzle is used, it has been found to be particularly expedient when the distribution element has a diameter at the end facing the opening of the filter element which corresponds to the diameter of the nozzle or has a diameter which is slightly greater than the diameter of the nozzle.

In the afore describe embodiment of the distribution element, an especially minimal flow resistance during the filtration operation can be achieved while simultaneously ensuring the desired uniform pressure distribution of the cleaning fluid during the cleaning process, when the dimensions of the distribution element are adjusted such to those of the filter element that the ratio of flow velocity of the fluid within the distribution element, flowing through the filter surface during the filtration operation and being discharged through the distribution element inserted into the opening of the filter element, relative to the flow velocity of the fluid external to the distribution element, flowing through the axial area of the filter surface surrounding the distribution element, is in the range of 0.4 to 2.5. Accordingly, on the one hand, the generation of a high dynamic pressure in the annular gap formed between the distribution element and the filter surface in the interior of the filter element is prevented and, on the other hand, the generation of an excessive dynamic pressure within the distribution element itself is prevented.

In addition or as an alternative to the above described distribution element, the distribution device according to the invention can also have a discharge element for the pressurized cleaning fluid comprising a plurality of discharge openings through which the cleaning fluid for cleaning the filter surfaces supplied via a supply line is discharged or introduced into the interior of the filter element for cleaning the filter element. This embodiment of the device according to the invention is based on the recognition that the use of several discharge openings for the cleaning fluid in general provides a more effective cleaning pulse than the use of only one large discharge opening for the cleaning fluid.

In particular in regard to the last-described embodiment it has been found to be especially expedient when the cleaning device has a line system for the cleaning fluid with which a plurality of filter elements can be cleaned simultaneously. In this connection, expediently at least two discharge elements for discharging the cleaning fluid for cleaning a filter surface of a filter element, respectively, are correlated with the line system wherein an especially uniform cleaning effect for all filter elements to be cleaned by one cleaning process is achieved when the discharge element through which the cleaning fluid supplied by the cleaning system passes first has more discharge openings than the discharge element arranged downstream thereof. The advantage of this arrangement resides in that the cleaning action, favored by the dynamic pressure which is generated at the rear end of the line system, for the filter elements arranged in this area during the cleaning process can be compensated by providing more discharge openings for the filter elements arranged during the cleaning process in the area of the forward end of the line system when viewed in the flow direction.

In the case that the cleaning fluid for cleaning the filter surfaces is to be discharged in the form of individual pressure pulses, such as gas pressure pulses, in particular, compressed air pulses, it was found to be particularly expedient when the line system has only one valve arrangement for generating the pressure pulses and the individual discharge elements are arranged at the outflow side of this valve arrangement. In this connection, it is in particular also considered to discharge the cleaning fluid through a nozzle in the direction toward the filter surfaces or interiors of the filters to be cleaned.

BRIEF DESCRIPTION OF THE DRAWINGS

In the following the invention will be explained with reference to the drawing to which express reference is being had with respect to all details that are important in regard to the invention and not explained in greater detail in the description. In the single FIGURE of the drawing a cleaning device according to the invention is schematically illustrated.

DESCRIPTION OF PREFERRED EMBODIMENTS

The cleaning device illustrated in the drawing is comprised substantially of a line system 10, such as a compressed air line and having a discharge opening for the cleaning fluid; a nozzle 20 through which the cleaning fluid, such as compressed air, can be discharged into the interior of a filter element which in its entirety is referenced by 100; and a distribution element 30 inserted into an opening 102 of the filter element forming during the filtration operation of the filter element 100 a discharge for the cleaned fluid.

The filter element 100 to be cleaned with the cleaning device illustrated in the drawing has substantially the shape of a hollow cylinder wherein the outlet opening 102 is arranged at one axial end of the filter element while the cylinder mantle surface 106 is formed by a filter material 104 such as, for example, a filter membrane or a filter fleece.

At the end opposite the outlet opening the filter element 100 is closed off by a bottom 110.

During normal filtration operation the fluid to be cleaned flows through the filter material 104 and is discharged from the filter element 100 by the distribution element 30 introduced into the outlet opening as illustrated in the drawing by arrows A. In this connection, the dust entrained by the fluid to be cleaned is deposited on the exterior surface 106 of the filter material 104.

For cleaning the filter surface formed by the exterior surface 106 of the filter material 104, by means of the line system 10 compressed air is introduced through the nozzle 20 and the distribution element 30 into the interior of the filter element 100. In this connection, by means of the distribution element 30 a turbulent flow of the introduced cleaning fluid is generated in the interior of the filter which results in a uniform pressure distribution of the cleaning fluid in the area of the entire filter surface 106 to be cleaned. For this purpose, the distribution element 30 is in the form of a truncated cone mantle which extends, starting at the outlet opening 102 in the direction toward the bottom 110, coaxially to the cylinder mantle-shaped exterior surface 106 of the filter material 104. The axial length L of the distribution element 30 corresponds in this connection approximately to 40% of the axial length L of the filter element 100. The diameter of the distribution element 30 corresponds at the end of the distribution element 30 facing the outlet opening 102 to the inner diameter D of the filter element 100. In the direction toward the bottom 110 of the filter element 100, the distribution element 30 tapers to a diameter d which is approximately 56% of the inner diameter D of the filter element 100.

For ensuring a disruption-free introduction of the cleaning fluid, the distribution element 30 at its end facing the outlet opening is provided with a smooth and rounded edge. On the other hand, the discharge element 30, at the end facing the bottom 110, is provided with a smooth cut edge for ensuring the desired turbulent flow of the cleaning fluid introduced through the nozzle 20 within the filter element 100. As can be seen in the drawing, in connection with the distribution element 30 inserted into the filter element 100, a nozzle 20 is expediently used whose diameter at the end facing the filter element 100 is smaller than the diameter of the distribution element 30 at its end facing the outlet opening.

With the described adjustment of the dimensions of the distribution element 30 to the dimensions of the filter element 100 it is ensured that the ratio of the velocity of the fluid within the distribution element 30 flowing through the filter material 104 during normal filtration operation to the velocity of the fluid flowing through the filter material 104 in the annular gap formed between the outer boundary surface of the distribution element 30 and the inner boundary surface 108 of the filter element 104 is in the range of 0.4 to 2.5 so that during the filtration operation a reduced flow resistance of the filter element is ensured, even when the distribution element 30 during filtration operation remains within the interior of the filter element 100.

The invention is not limited to the embodiment illustrated in connection with the drawing. In addition, it is also considered to employ, for maintaining a uniform pressure distribution of the cleaning fluid in the area of the entire filter surface to be cleaned, a discharge element with a plurality of discharge openings for discharging the cleaning fluid. Moreover, instead of the truncated cone mantle-shaped distribution element, a cylinder mantle-shaped distribution element can be used. Moreover, instead of the distribution element secured in the area of the inner rim of the outlet opening a distribution element can be used which engages across the axial end of the filter element 100.

What is claimed is:

1. Arrangement comprising a filter element and a device for cleaning a substantially cylinder mantle-shaped filter surface (106) of a filter element (100), through which a fluid to be cleaned flows during filtration operation, by means of a pressurized cleaning fluid, wherein a distribution device (30) having a flow guiding surface for the cleaning fluid exiting from a pressure line is provided, with which a substantially uniform pressure distribution of the cleaning fluid in the area of the entire filter surface to be cleaned is promoted, wherein the flow guiding surface extends coaxially to the filter surface, is as a whole substantially truncated cone mantle-shaped, and extends, beginning at an opening (102) arranged at an axial end of the filter element, across 20 to 70% of the axial length (L) of the filter element (100).

2. Arrangement according to claim 1, wherein the distribution device comprises a distribution element (30) insertable into an opening of the filter element which forms an outlet for the cleaned fluid during filtration operation.

3. Arrangement according to claim 2, wherein the distribution element (30) extends, beginning at the opening (102), across 20 to 50%, of the axial length (L) of the filter element (100).

4. Arrangement according to claim 2, wherein the diameter (d) of the distribution element (30) at its end facing away from the opening (102) corresponds approximately to 40 to 95% of the inner diameter (D) of the filter element (100).

5. Arrangement according to claim 2, wherein the dimensions of the distribution element (30) are adjusted such to those of the filter element (100) that the ratio of the flow velocity of the fluid within the distribution element (30), flowing during the filtration operation through the filter surface (106) and being discharged through the distribution element (30) inserted into the opening (102) of the filter element (100), to the flow velocity of the fluid outside of the distribution element (30), flowing through the axial area of the filter surface (106) surrounding the distribution element (30), is in the range of 0.4 to 2.5.

6. Arrangement according to claim 1, wherein the distribution device comprises a discharge element for the pressurized cleaning fluid with a plurality of discharge openings through which the cleaning fluid supplied by a supply line is discharged for cleaning the filter surface.

7. Arrangement according to claim 6, wherein the discharge element can be operated for discharging the cleaning fluid into the interior of the filter element.

8. Arrangement according to claim 1, wherein a line system for the cleaning fluid with which a plurality of filter elements can be cleaned simultaneously.

9. Arrangement according to claim 1, wherein the line system has correlated therewith at least two discharge elements for discharging the cleaning fluid for cleaning a filter surface, respectively, wherein the discharge element through which the cleaning fluid supplied first via the line system has more discharge openings than the discharge element arranged downstream thereof.

10. Arrangement according to claim 1, wherein the cleaning fluid for cleaning the filter surface is discharged in the form of individual pressure pulses, preferably gas pressure pulses, particularly preferred compressed air pulses.

11. Arrangement according to claim 9, wherein the line system comprises a valve arrangement for generating the pressure pulses and the individual discharge elements are arranged at the outflow side of the valve arrangement.

12. Arrangement according to claim 1, wherein at least one nozzle configured for discharging the cleaning fluid.

13. Arrangement comprising a filter element and a device for cleaning a substantially cylinder mantle-shaped filter surface (106) of a filter element (100), through which a fluid to be cleaned flows during filtration operation, by means of a pressurized cleaning fluid, wherein a distribution device (30) having a flow guiding surface for the cleaning fluid exiting from a pressure line is provided, with which a substantially uniform pressure distribution of the cleaning fluid in the area of the entire filter surface to be cleaned is promoted, wherein the flow guiding surface extends coaxially to the filter surface, is as a whole substantially truncated cone mantle-shaped, and extends, beginning at an opening (102) arranged at an axial end of the filter element, across 20 to 70% of the axial length (L) of the filter element (100), while the diameter (d) of the distribution element (30) at its end facing away from the opening (102) corresponds approximately to 40 to 95% of the inner diameter (D) of the filter element (100).

* * * * *